Patented Apr. 15, 1952

2,593,125

UNITED STATES PATENT OFFICE 2,593,125

PROCESS OF COAGULATING ASBESTOS

Samuel Edward Eaton, Lexington, and Charles G. Harford, Quincy, Mass., assignors to Arthur D. Little, Inc., Cambridge, Mass., a corporation of Massachusetts No Drawing. Application July 9, 1949, Serial No. 103,944

2 Claims. (Cl. 252—315)

This invention relates to a process of removing water from an aqueous dispersion of finely divided asbestos and is a continuation-in-part of our U. S. application Ser. No. 621,594 filed October 10, 1945, now abandoned.

For some specialized purposes asbestos greatly reduced in particle size is particularly advantageous. Two methods are known for so reducing asbestos. By one of these methods the asbestos is ground dry. This method is unsatisfactory for large scale production of such material because of the difficulty in handling, dust, and slowness of the operation. The second known process of reducing asbestos consists in beating it in a quantity of water much in the same manner as wood pulp is reduced. Ordinarily a 1% to 2% slurry of asbestos is as thick as may be conveniently handled although the optimum percentage may vary with the type of asbestos. From about .05 to 3% are the practical limits of concentration. A dilute slurry is necessary because a more concentrated suspension would be so thick as to necessitate an inordinately long time of beating to obtain proper particle size. Agitation is carried out in a paper mill beater, for instance, until the asbestos has been reduced to the size desired which may be determined by microscopic examination. Practically, the correct size is determined by the appearance of the suspension of the asbestos in the beater. The resulting fibers ordinarily will be between about 10 microns and about 100 microns in length. The diameter is ordinarily less than 3 microns and diameters in the order of 1 or 2 microns, or less, make up the bulk of the suspension.

The principal difficulty with the wet process just described is that of the removal of water. The water cannot be removed in practice by filtration, and removing the water by means of heat is a long and costly process. If the water is pressed out, a hard cake is formed which is slow to dry and when dry is difficult to disintegrate into a usable form.

It is an object of this invention to remove a large part of the water from a dilute water-asbestos mixture when the asbestos is in a finely divided condition.

Briefly, this object may be accomplished by adding a coagulant to the suspension, filtering or decanting off a large part of the water, and, if desired, drying the remainder as with heat.

There are several different kinds of asbestos and although their physical and chemical properties vary somewhat, all exhibit the same general characteristics. Chrysotile asbestos, which is the most important commercially, is one of the most difficult to separate from its water suspensions, and the application of the process has been particularly directed toward recovering this variety from dilute suspensions, although amosite as well as other types may be treated advantageously by the process of this invention.

When the asbestos has been reduced to the desired size, a one per cent mixture appears as a thick slurry, each individual fiber or bundle of fibers apparently holding water to its surface in a not fully understood physical or chemical manner. It is this hydration which gives the finely divided asbestos some of its unique characteristics, and makes the removal of water so difficult.

In order to filter the material a large filterable flock, containing substantially all the asbestos, is coagulated. A large percentage of the water may then be drained off. If desired, the flock may be pressed to remove more water and/or dried as by the use of heat.

It has been found that the asbestos suspended in water will "combine" physically with certain precipitates. Such precipitates result when water soluble proteins such as gelatin, and glue, are precipitated with aluminum hydroxide, ferric hydroxide, or tannic acid; or when ammonium caseinate is precipitated with strong acids; they also result when high molecular weight water-soluble polyhydroxy compounds, such as cornstarch, are precipitated with aluminum hydroxide or ferric hydroxide, or alginates precipitated with strong acids. In any case the precipitate is one which is curdy and adhesive in character if it is to successfully precipitate the asbestos. Stated another way, a colloidally dispersed material when precipitated to form a curdy adhesive material will cause partial separation of asbestos from water in which it is suspended. The exact mechanism of the action appears not to be material and varies with different precipitants. It is, however, a type of mechanical action whereby the precipitate formed in the solution, or introduced into the solution, surrounds and entangles the fine asbestos particles to form a flock. The entire process may be termed the coagulating of the asbestos.

The method of adding the coagulant depends in part upon the coagulant used. In general where two or more ingredients are to be employed to cause a precipitate they may be added to the asbestos slurry successively and with slow agitation. When the final ingredient causing the curdy adhesive precipitate is added, the coagulation occurs sometimes over a period of a few seconds and the asbestos is removed from suspension.

In other cases the addition of an already formed coagulant will cause the coagulation of the asbestos. An example of such a coagulant is the gelatin-tannic acid reaction product.

The following examples will illustrate the nature of the invention. In each of the examples given a water suspension of asbestos as described above is treated with various coagulating agents.

Example I

To 100 parts of a 1% suspension of finely divided asbestos was added 10 parts of a 3% ammonium alginate solution followed by acidification to pH 1 with hydrochloric acid to produce a curdy adhesive precipitate. Excellent coagulation of asbestos is secured so that much of the water may be removed by filtration.

Example II 5 parts of a 1 per cent solution of gelatin in water were added to 20 parts of a 1% asbestos slurry. One part of a 1% aluminum chloride solution and ½ part of 2.8% ammonia were added thereafter. The resulting gelatin-aluminum hydroxide curdy adhesive product coagulated the asbestos. The above reaction is, in effect, the addition of aluminum hydroxide to gelatin and asbestos.

Similar results were obtained using wheat starch or cornstarch or whole wheat flour or white flour with aluminum hydroxide prepared from aluminum chloride and ammonia.

Example III

To 10 parts of 1% asbestos slurry were added 2 parts of 1% potato starch, and 2 parts of 1% aluminum chloride solution. Ammonia was added until a pH of 8 was obtained. Good coagulation of the asbestos resulted from the curdy adhesive precipitate.

Example IV 1 part of a 1% gelatin solution was added to 10 parts of a 1% asbestos slurry. To the mixture was added 1 part of a 1% tannic acid solution. The resulting precipitate caused some coagulation and separation of the asbestos. When the quantity of the gelatin solution was increased to 2 parts and the tannic acid to 3 parts, the coagulation was excellent. The precipitate was curdy and adhesive.

Example V

To 50 ml. of 0.85% asbestos slurry was added 10 ml. of 1% cornstarch solution and 10 ml. of 1% $FeCl_3$ solution. About 0.5 ml. 28% $NH_4OH$ was added to a pH of about 8. Good coagulation of the asbestos resulted from the curdy adhesive precipitate.

Example VI

To 50 ml. of 0.85% asbestos slurry was added 10 ml. of 1% casein in slightly ammoniacal solution. HCl was added to pH 2 and a curdy adhesive precipitate formed which allowed separation of water from the asbestos.

It may be seen that the various methods of inducing a curdy, adhesive precipitate were immaterial so long as there was sufficient present to coagulate the asbestos. Although the minimum effective amount of coagulant which must be added must be determined experimentally for each coagulant, the order of magnitude is indicated by the examples and is at least about 5% by weight of solids added to the weight of asbestos and more generally is in the order of at least 10%.

The mere formation of a precipitate may be insufficient for coagulation of the asbestos. For instance, a precipitate of barium sulfate will not precipitate the asbestos. The crystals formed appeared too fine and non-curdy in nature. Aluminum hydroxide alone is not sufficient. While aluminum hydroxide is flocculent and gelatinous in nature, it appears to lack the requisite curdy character to cause coagulation. Gelatin, ammonium alginate, or casein alone are not effective. It may be noted, however, that any of the above agents may be used advantageously when in combination with other suitable materials.

To practice this invention it is necessary to add, or preferably to cause to be formed in situ, a curdy adhesive precipitate which acts as a coagulant. Where two or more materials are employed, they are preferably employed in such proportions that neither is in appreciable excess.

As stated above, after the asbestos has been coagulated, a large part of the water may be easily removed as by decantation or filtration. The remainder of the water may then be removed quite easily by evaporation with the aid of heat. To remove further water from the precipitate an equal volume or greater of a solvent for water, which however must be largely immiscible with water, such as n-butanol, or methylethyl ketone, may be added with agitation. Upon standing, the solvent separates carrying with it some of the remaining water. The product may then be finally dried. By using n-butanol the solids content of the slurry may be doubled.

The resulting product is useful for many purposes because of its unique properties. For instance, a one per cent addition to an oil causes the oil to gel, yet the viscosity does not change a great deal with temperature. The addition of 1% of the dry asbestos to paint serves as an excellent suspending medium for pigments.

If desired this process may be used to reduce water content of asbestos slurries temporarily, for example during shipment, and the asbestos may be then redispersed by redissolving the coagulant and adding water. Thus in Example VI, when the mixture is made alkaline with ammonia and agitated, the casein redissolves and the asbestos redisperses.

We claim:

1. The process of coagulating finely divided asbestos suspended in the water which comprises preparing a coagulant suspended in water and adding said coagulant suspension to the asbestos suspension, said coagulant being formed by precipitating gelatin with tannic acid to yield a curdy adhesive precipitate in an amount sufficient to coagulate said asbestos.

2. The process of coagulating finely divided asbestos suspended in water which comprises preparing a coagulant in situ, said coagulant being formed by precipitating gelatin with tannic acid to yield a curdy adhesive precipitate in an amount sufficient to coagulate said asbestos.

SAMUEL EDWARD EATON.
CHARLES G. HARFORD.

REFERENCES CITED

The following references are of record in the file of this patent:

UNITED STATES PATENTS

| Number | Name | Date |
| --- | --- | --- |
| 1,967,062 | Novak | July 17, 1934 |
| 1,971,162 | Novak | Aug. 21, 1934 |
| 2,351,259 | Fuetterer | June 13, 1944 |

FOREIGN PATENTS

| Number | Country | Date |
| --- | --- | --- |
| 433,974 | Great Britain | Aug. 23, 1935 |
| 562,161 | Great Britain | June 21, 1944 |